United States Patent
Kang et al.

(10) Patent No.: US 11,901,578 B2
(45) Date of Patent: Feb. 13, 2024

(54) SEPARATOR COMPRISING POROUS ADHESIVE LAYER, AND LITHIUM SECONDARY BATTERY USING SAME

(71) Applicant: Samsung SDI Co., Ltd., Yongin-si (KR)

(72) Inventors: Seyeong Kang, Suwon-si (KR); Gain Kim, Suwon-si (KR); Byung-Soo Kim, Suwon-si (KR); Yongkyoung Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 825 days.

(21) Appl. No.: 16/096,659

(22) PCT Filed: Nov. 16, 2016

(86) PCT No.: PCT/KR2016/013186
§ 371 (c)(1),
(2) Date: Oct. 25, 2018

(87) PCT Pub. No.: WO2017/188537
PCT Pub. Date: Nov. 2, 2017

(65) Prior Publication Data
US 2021/0234235 A1 Jul. 29, 2021

(30) Foreign Application Priority Data
Apr. 28, 2016 (KR) .................. 10-2016-0052543

(51) Int. Cl.
*H01M 50/403* (2021.01)
*H01M 50/426* (2021.01)
(Continued)

(52) U.S. Cl.
CPC ..... *H01M 50/403* (2021.01); *H01M 10/0525* (2013.01); *H01M 50/42* (2021.01);
(Continued)

(58) Field of Classification Search
CPC ............ H01M 50/449; H01M 50/446; H01M 10/0525; H01M 50/411–426
(Continued)

(56) References Cited

U.S. PATENT DOCUMENTS

2013/0143095 A1* 6/2013 Takagi .................. C08J 7/0427
429/144
2014/0057057 A1* 2/2014 Terai ....................... B32B 27/32
427/535
(Continued)

FOREIGN PATENT DOCUMENTS

CN 101373848 A 2/2009
CN 102883885 A 1/2013
(Continued)

OTHER PUBLICATIONS

English machine translation of JP 2010/231957 to Tsukada et al.(Year: 2010).*
(Continued)

*Primary Examiner* — Kourtney R S Carlson
(74) *Attorney, Agent, or Firm* — Lewis Roca Rothgerber Christie LLP (57) ABSTRACT

The present invention relates to a separator, a manufacturing method therefor, and a lithium secondary battery comprising the same, the separator comprising: a porous substrate; and a porous adhesive layer formed on one surface or both surfaces of the porous substrate, wherein the porous adhesive layer comprises a nitrogen-containing binder and polyvinylidene fluoride-based polymer microparticles having an average diameter of 200 nm to 700 nm, and the total thickness of the porous adhesive layer is 1 μm or less.

6 Claims, 1 Drawing Sheet

(51) Int. Cl.
  *H01M 50/446* (2021.01)
  *H01M 10/0525* (2010.01)
  *H01M 50/491* (2021.01)
  *H01M 50/457* (2021.01)
  *H01M 50/423* (2021.01)
  *H01M 50/42* (2021.01)
  *H01M 50/443* (2021.01)
  *H01M 50/451* (2021.01)

(52) U.S. Cl.
  CPC ....... *H01M 50/423* (2021.01); *H01M 50/426* (2021.01); *H01M 50/443* (2021.01); *H01M 50/446* (2021.01); *H01M 50/451* (2021.01); *H01M 50/457* (2021.01); *H01M 50/491* (2021.01)

(58) Field of Classification Search
  USPC ......................................................... 429/144
  See application file for complete search history.

(56) References Cited

U.S. PATENT DOCUMENTS

| | | | | |
|---|---|---|---|---|
| 2014/0363726 A1* | 12/2014 | Honda | ................ | H01M 10/052 429/145 |
| 2014/0370358 A1* | 12/2014 | Hong | ................ | H01M 50/446 429/126 |
| 2015/0125736 A1* | 5/2015 | Kim | ................ | H01M 10/052 429/144 |
| 2015/0207122 A1 | 7/2015 | Yoshitomi | | |
| 2015/0349326 A1* | 12/2015 | Miyazaki | ............ | H01M 4/131 429/231.95 |
| 2018/0269453 A1* | 9/2018 | Cho | ................ | H01M 50/449 |

FOREIGN PATENT DOCUMENTS

| | | |
|---|---|---|
| CN | 103947009 A | 7/2014 |
| CN | 104521030 A | 4/2015 |
| CN | 105190941 A | 12/2015 |
| CN | 105470519 A | 4/2016 |
| JP | 3393145 B2 | 4/2003 |
| JP | 3426253 B2 | 7/2003 |
| JP | 2005-276503 A | 10/2005 |
| JP | 3756815 B2 | 3/2006 |
| JP | 2010-231957 A | 10/2010 |
| JP | 2013-101954 A | 5/2013 |
| KR | 10-2008-0013209 A | 2/2008 |
| KR | 10-2009-0085538 A | 8/2009 |
| KR | 10-2012-0138778 A | 12/2012 |
| KR | 10-2014-0066786 A | 6/2014 |
| KR | 10-2014-0078966 A | 6/2014 |
| KR | 10-2014-0126978 A | 11/2014 |
| KR | 10-2015-0015918 A | 2/2015 |
| KR | 10-2015-0106810 A | 9/2015 |

OTHER PUBLICATIONS

Chinese Office Action, with English translation, dated Jul. 27, 2021, issued in corresponding Chinese Patent Application No. 201680085015.X (13 pages).

Chinese Office Action, with English translation, dated Dec. 31, 2020, for corresponding Chinese Patent Application No. 201680085015.X (17 pages).

Office Action dated Jan. 24, 2022, and accompanying Search Report dated Jan. 14, 2022, of the corresponding Chinese Patent Application No. 201680085015.X, 24pp.

Office Action (Decision of Rejection) dated Apr. 29, 2022 of the corresponding Chinese Patent Application No. 201680085015.X., 14pp.

Office action issued in corresponding CN Application No. 201680085015, issued Sep. 29, 2022 including English lang. translation. Office action includes Search Report dated Sep. 20, 2022, 14pp.

Zheng, Zhong, and HU, Jihua, "Physical and Chemical Principles of Surfactants" South China University of Technology Press, Guangzhou, Mar. 31, 1995, pp. 9-10.

Decision of Rejection dated Mar. 30, 2023 the corresponding Chinese Patent Application No. 201680085015.X, 17pp., including Eng. translation identifying relevant parts.

* cited by examiner

SEPARATOR COMPRISING POROUS ADHESIVE LAYER, AND LITHIUM SECONDARY BATTERY USING SAME

CROSS-REFERENCE TO RELATED APPLICATION(S)

This application is a National Phase Patent Application of International Patent Application Number PCT/KR2016/013186, filed on Nov. 16, 2016, which claims priority of Korean Patent Application No. 10-2016-0052543, filed Apr. 28, 2016. The entire contents of both of which are incorporated herein by reference.

TECHNICAL FIELD

The present invention relates to a separator comprising a porous substrate and a porous adhesive layer formed on one surface or both surfaces of the porous substrate, wherein the porous adhesive layer comprises polyvinylidene fluoride-based polymer microparticles and a nitrogen-containing binder, and a lithium secondary battery using the same.

BACKGROUND ART

A lithium secondary battery is an energy reservoir capable of being charged and discharged through a reversible conversion of chemical energy into electrical energy and having high energy density. Recently, the lithium secondary battery has been applied to a hybrid electric vehicle (HEV), a plug-in electric vehicle, an electric bike, and an energy storage system (ESS) in response to an environment problem, a high oil price, and energy efficiency and storage.

The lithium secondary battery may include a separator. The separator means an interlayer separating a positive electrode and a negative electrode in a battery and also steadily maintaining ion conductivity to enable the battery to be charged and discharged. The lithium secondary battery may be heated and exploded due to a short circuit between positive and negative electrodes by an internal cell abnormality or an external impact, and accordingly, thermal/chemical safety of a separator as an insulator is important to secure.

Regarding this, Japanese Patent Laid-Open Publication No. 2005-276503 discloses a method of using polyvinyl alcohol as an adhesive that adheres an electrode to a separator. However, the polyvinyl alcohol may bring about insufficient shape stability of a battery. Specifically, a thermal shrinkage rate of the separator is increased according to charges and discharges, air permeability of the separator is increased, and accordingly, charge and discharge characteristics of a battery may be easily deteriorated.

Accordingly, a separator capable of securing adherence to an electrode and simultaneously, improving shape stability of a battery needs to be provided.

DISCLOSURE

Technical Problem

An embodiment is to provide a separator having excellent adherence to an electrode as well as maintaining characteristics of a porous substrate such as air permeability, porosity, or the like by making a porous adhesive layer into a thin film and maintaining shape stability of a battery after charges and discharges, and a lithium secondary battery using the same.

Technical Solution

According to an embodiment of the present invention, a separator includes a porous substrate; and a porous adhesive layer formed on one surface or both surfaces of the porous substrate, wherein the porous adhesive layer includes polyvinylidene fluoride-based polymer microparticles having an average diameter of 200 nm to 700 nm and a nitrogen-containing binder, and the total thickness of the porous adhesive layer is 1 µm or less.

According to another embodiment of the present invention, a lithium secondary battery includes a positive electrode, a negative electrode, an electrolyte, and the separator.

According to another embodiment of the present invention, a method of manufacturing a separator includes preparing a porous adhesive layer composition including polyvinylidene fluoride-based polymer microparticles having an average diameter of 200 nm to 700 nm, a nitrogen-containing binder, and a solvent, and applying the porous adhesive layer composition to one surface or both surfaces of a porous substrate and drying the same to form a porous adhesive layer.

Advantageous Effects

The separator according to an embodiment of the present invention includes a porous adhesive layer having a thickness of less than or equal to 1 µm and thus may maintain characteristics of a porous substrate and in addition, show improved adherence to an electrode and as well as maintain shape stability of a battery after charges and discharges. Specifically, the separator shows an excellent thermal shrinkage rate and improved adherence to an electrode and in addition, has much improved air permeability by making a porous adhesive layer into a thin film.

MODE FOR INVENTION

Hereinafter, embodiments of the present invention are described in detail. The disclosures that are not described in the present specification may be fully recognized and by conveyed by those skilled in the art in a technical or similar field of the present invention and thus are omitted herein.

A separator according to an embodiment of the present invention includes a porous substrate and a porous adhesive layer formed on one surface or both surfaces of the porous substrate.

The porous substrate may have a plurality of pores and may generally be a porous substrate used in an electrochemical device. Non-limiting examples of the porous substrate may be a polymer film formed of a polymer or a mixture of two or more of polyethylene, polypropylene, polyethyleneterephthalate, polybutyleneterephthalate, polyester, polyacetal, polyamide, polyimide, polycarbonate, polyetheretherketone, polyaryletherketone, polyetherimide, polyamideimide, polybenzimidazole, polyethersulfone, polyphenyleneoxide, a cyclic olefin copolymer, polyphenylenesulfide, and polyethylene naphthalene. For example, the porous substrate may be a polyolefin-based substrate, and the polyolefin-based substrate may improve safety of a battery due to its improved shut-down function. The polyolefin-based substrate may be for example selected from a polyethylene single film, a polypropylene single film, a polyethylene/polypropylene double film, a polypropylene/polyethylene/polypropylene triple film, and a polyethylene/polypropylene/polyethylene triple film. As another example, the polyolefin-based resin may include a non-olefin resin in addition to an olefin resin or a copolymer of olefin and a non-olefin monomer. The porous substrate may have a thickness of 1 µm to 40 µm, specifically 5 µm to 15 µm, and more specifically 5 µm to 10 µm. When the porous substrate has a thickness within the ranges, the porous substrate has a desirable thickness, that is it is sufficiently thick so that short circuit between a positive electrode and a negative electrode may be prevented while is not thick so that internal resistance of a battery is increased. Air permeability of the porous substrate may be less than or equal to 250 sec/100 cc, specifically less than or equal to 200 sec/100 cc, more specifically less than or equal to 150 sec/100 cc and porosity may be 30% to 80%, and specifically 40% to 60%.

The porous adhesive layer may be formed of a porous adhesive layer composition. In an embodiment, the porous adhesive layer composition may include polyvinylidene fluoride (PVdF)-based polymer microparticles, a nitrogen-containing binder, and a solvent. More specifically, the porous adhesive layer composition may consist of the polyvinylidene fluoride-based polymer microparticles, the nitrogen-containing binder, and the solvent.

The polyvinylidene fluoride-based polymer microparticles include a polyvinylidene fluoride-based polymer and may have a spherical shape or a particle shape near to a spherical shape.

An average particle diameter of the polyvinylidene fluoride-based polymer microparticles may be 200 nm to 700 nm, specifically 300 nm to 600 nm, and more specifically 400 nm to 500 nm. When the polyvinylidene fluoride-based polymer microparticles have an average particle diameter within the ranges, adherence between the porous adhesive layer and the porous substrate and between the separator and the electrode is secured, and air permeability of the separator may be prevented from being extremely increased. In addition, when the average particle diameter satisfies the ranges, the polyvinylidene fluoride-based polymer microparticles may be uniformly dispersed in the porous adhesive layer, and thus shape stability of a battery may be improved. Non-limited examples of a method of measuring the average particle diameter of the polyvinylidene fluoride-based polymer microparticles may be as follows.

S3500 made by Microtrac Inc. is used as a laser-diffraction size analyzer. S3500 made by Microtrac Inc. has a unique internal structure of using three laser light sources and two detectors unlike a conventional method using one laser light and thus may be appropriate for a spherical or nonspherical shape particle analysis. The average particle diameter may be measured by fixing a solvent with water, dripping one drop of a coating liquid with a dripping pipette, and measuring a particle distribution using a sedimentation velocity method.

The polyvinylidene fluoride-based polymer microparticles may be a polyvinylidene fluoride-based homopolymer (polyvinylidene fluoride homopolymer), a polyvinylidene fluoride-based copolymer (polyvinylidene fluoride copolymer), or a mixture thereof. The polyvinylidene fluoride homopolymer may be a polymer including only vinylidene fluoride (VDF)-derived unit or a polymer including other monomers-derived unit in addition to vinylidene fluoride-derived unit in an amount of less than or equal to 5 wt %. Herein, the other monomers-derived unit may be a unit derived from chlorotrifluoroethylene (CTFE), trifluoroethylene (TFE), ethylenetetrafluoride, or an ethylene monomer and the polyvinylidene fluoride-based homopolymer may not include a hexafluoropropylene (HFP)-derived unit as the other monomers-derived unit. The polyvinylidene fluoride-based copolymer may be a copolymer prepared by polymerization of vinylidene fluoride and other monomers. Specifically, it may be a copolymer prepared by polymerization of vinylidene fluoride and hexafluoropropylene and the copolymer may include 5 wt % to 20 wt % of the hexafluoropropylene-derived unit. Alternatively, it may be a copolymer of the vinylidene fluoride and other monomers, for example, chlorotrifluoroethylene (CTFE), trifluoroethylene (TFE), ethylenetetrafluoride, or an ethylene monomer. An amount of the other monomers-derived unit may be less than or equal to 20 wt %, for example less than or equal to 10 wt %, or less than or equal to 3 wt % of the copolymer. The polyvinylidene fluoride-based copolymer may include a polyvinylidene fluoride-hexafluoropropylene (PVdF-HFP)-based copolymer including a vinylidene fluoride-derived unit and a hexafluoropropylene-derived unit. The polyvinylidene fluoride-hexapropylene-based copolymer may include a polyvinylidene fluoride-hexafluoropropylene (PVdF-HFP) binary copolymer, or a ternary or more copolymer including other additional units in addition to the vinylidene fluoride-derived unit and the hexafluoropropylene-derived unit. Specifically, the polyvinylidene fluoride-based polymer may be a polyvinylidene fluoride-based homopolymer. The polyvinylidene fluoride-based homopolymer may improve adherence of the porous adhesive layer to the porous substrate and the electrode.

A weight average molecular weight (Mw) of the polyvinylidene fluoride-based polymer microparticles may range from 400000 to 600000, specifically 450000 to 550000, and more specifically 450000 to 500000. When the polyvinylidene fluoride-based polymer microparticles having a weight average molecular weight within the ranges are used, adherence between the porous adhesive layer and the electrode and thus stability of the separator may be improved, adherence between the separator and the porous substrate after the charge and discharge may be reinforced, and accordingly, a battery having efficient electricity output may be provided.

The polyvinylidene fluoride-based polymer microparticles may be included in an amount of 90 wt % to 99.9 wt %, specifically 95 wt % to 99 wt %, and more specifically 96 wt % to 98 wt % based on a total solid weight of the porous adhesive layer. When the polyvinylidene fluoride-based polymer microparticles are used within the ranges, adherence between the porous adhesive layer and the electrode and between the separator and the porous substrate is secured, and thus air permeability of the separator may be improved.

The nitrogen-containing binder may include an imine compound or an amine compound. The imine compound may be polyalkyleneimine or polyamideimide and the polyalkyleneimine may be specifically polyethyleneimine, alkyl- or cyclopentyl-modified polyethyleneimine, but is not limited thereto. The amine compound may be polyalkylenepolyamine, polyamide, or a polyurethane resin and the polyalkylenepolyamine may be polyethylenepolyamine or ethylenediamine, but is not limited thereto. In addition, the nitrogen-containing binder may be polyacrylonitrile, polyphosphazene, and the like. Furthermore, the nitrogen-containing binder may be the above compounds alone or in a mixture thereof. The nitrogen-containing binder may improve adherence between the porous substrate and the porous adhesive layer.

Specifically, the nitrogen-containing binder may be polyethyleneimine. When the nitrogen-containing binder is polyethyleneimine, adherence between the porous substrate and the porous adhesive layer may be further improved and compatibility with the polyvinylidene fluoride-based polymer microparticles may be improved. A weight average molecular weight of the polyethyleneimine may be 50000 to 100000, specifically a weight average molecular weight (Mw) may be 60000 to 80000, or more specifically 65000 to 75000.

A weight ratio of the polyvinylidene fluoride-based polymer microparticles and the nitrogen-containing binder may be 8.5:1.5 to 9.9:0.1, specifically 8.8:1.2 to 9.8:0.2, or more specifically 9:1 to 9.6:0.4. When the nitrogen-containing binder is used in a higher amount than the weight ratio range, a thermal shrinkage rate of the separator is increased, and thus a battery cycle-life is remarkably decreased. In addition, when the polyvinylidene fluoride-based polymer microparticles are used in a higher amount than the weight ratio range, air permeability of the separator may be extremely increased.

The solvent may be any generally-used solvent in the art and may be for example water, alcohol, or a mixture thereof. The alcohol may be methanol, ethanol, propanol, isopropanol, butanol, t-butanol, pentenol, and the like, but is not limited thereto. Specifically, it may be water. An amount of the solvent may be 80 to 95 wt %, specifically 85 to 95 wt %, or more specifically 90 to 95 wt % based on a weight of the porous adhesive layer composition. When the solvent is included within the ranges, the porous adhesive layer composition may be easily prepared, and thus a drying process of the porous adhesive layer may be smoothly performed.

The porous adhesive layer may be formed by removing a solvent from the porous adhesive layer. Therefore, the porous adhesive layer may include the vinylidene fluoride-based polymer microparticles and the nitrogen-containing binder and may specifically consist of the vinylidene fluoride-based polymer microparticles and the nitrogen-containing binder. The porous adhesive layer may have a thickness of less than or equal to 1 μm, specifically, less than or equal to 0.8 μm, and more specifically, less than or equal to 0.5 μm. Herein, the thickness of the porous adhesive layer denotes a total thickness of the porous adhesive layer on one surface or both surfaces of the porous substrate. When the polyvinylidene fluoride-based polymer microparticles and the nitrogen-containing binder are used together, the thickness may not only be secured within the ranges, but sufficient adherence between the porous adhesive layer and the porous substrate may also be secured, and accordingly, shape stability of a battery may be maintained after the charge and discharge. Simultaneously, as the porous adhesive layer is formed as a thin film, property deterioration of the porous substrate is prevented, for example, air permeability may be improved.

Hereinafter, a separator according to another embodiment of the present invention is described. The separator according to the present embodiment includes substantially the same constituent elements as the separator according to the aforementioned embodiment of the present invention except for additionally including inorganic particles in the porous adhesive layer composition or the porous adhesive layer, and accordingly, the inorganic particles are mainly illustrated here.

The inorganic particle is not particularly limited and may be any generally-used inorganic particle in this art. In one example of the present invention, non-limiting examples of available inorganic particles may be $Al_2O_3$, $AlO(OH)$, $SiO_2$, $B_2O_3$, $Ga_2O_3$, $TiO_2$, or $SnO_2$. These may be used alone or in a mixture of two or more. The inorganic particle used in one embodiment of the present invention may be for example, $AlO(OH)$ (boehmite) or $Al_2O_3$(alumina). A size of the inorganic particle used in an embodiment of the present invention is not particularly limited, but its average particle diameter may be 1 nm to 2,000 nm, for example, 100 nm to 1,000 nm, and more specifically 300 nm to 600 nm. When the inorganic particle has sizes within the ranges, the inorganic particle may be prevented from deterioration of dispersity and processability in the porous adhesive layer, a thickness of an adhesive layer is appropriately adjusted, and accordingly, deterioration of mechanical properties and an increase of electrical resistance may be prevented. In addition, sizes of pores generated in the porous adhesive layer are appropriately controlled and thus a possibility of internal short-circuit may be reduced during charge and discharge of a battery.

The inorganic particle may be included in an amount of 5 wt % to 35 wt %, specifically 5 wt % to 25 wt %, and more specifically 10 wt % to 20 wt % based on a total solid weight of the porous adhesive layer. When the inorganic particle is included within the ranges, heat dissipation properties of the inorganic particle may be sufficiently realized, and thermal shrinkage of the separator may be effectively suppressed.

In preparation of the composition for forming the porous adhesive layer, the inorganic particle may be used in a form of inorganic dispersion in which it is dispersed in an appropriate solvent. The appropriate solvent is not particularly limited and may be any generally-used solvent in this art. The appropriate solvent for dispersing the inorganic particle may be for example water. The inorganic dispersion may be prepared using a general method without a particular limit, for example, using a method of adding an appropriate amount of $Al_2O_3$ to an appropriate solvent and then, dispersing the mixture by milling the same with a beads mill.

The separator according to embodiments of the present invention may have air permeability of less than or equal to 300 sec/100 cc, specifically less than or equal to 250 sec/100 cc, and more specifically 220 sec/100 cc to 190 sec/100 cc. The air permeability of the separator is measured as a time (sec) taken for 100 cc of air to pass the separator, for example, by using EG01-55-1MR (Asahi Seiko Inc.).

The separator according to embodiments of the present invention may have a transfer rate of a positive or negative active material after the charge and discharge of Formula 1 of greater than or equal to 60%.

$$\text{Transfer rate } (\%) = (A_1/A_0) \times 100 \qquad \text{[Equation 1]}$$

In Equation 1, $A_0$ denotes an entire area of a negative electrode or a positive electrode and $A_1$ denotes an area of a positive active material or a negative active material transferred into the separator when charge, discharge, and charge are sequentially performed after a positive electrode, a separator, and a negative electrode are sequentially stacked to form an electrode assembly, first compressing the electrode assembly at 20° C. to 110° C., for 1 to 5 seconds, and at a force of 1 to 30 kgf/cm², injecting an electrolyte solution to the compressed electrode assembly, and second compressing the same at 60° C. to 110° C., for 30 seconds to 180 seconds, at a force of 1 to 30 kgf/cm². The area of the positive active material or the negative active material may be measured using any method as long as it may measure the active material area without a particular limit, but the area of the positive active material or the negative active material may be for example measured by using a known image analyzer (ex: Easy Measure converter 1.0.0.4) after taking an image of the separator with a known image camera (ex: a high resolution camera, Lumenera Corp.).

Examples of conditions of the charge, discharge, and charge are as follows.

1) charge: 4.35 V, 0.2 C, 50 mA cut-off, 5 hours
2) discharge: 0.2 C, 3 V cut-off, 5 hours
3) charge: 0.5 C, 4 V cut-off, 2 hours A transfer rate of greater than or equal to 60% of the positive active material or the negative active material have a relation with a battery shape and adherence after charge and discharge. The transfer rate may be specifically greater than or equal to 65%, more specifically greater than or equal to 70%.

The separator according to embodiments of the present invention may have a thermal shrinkage rate in each of machine direction (MD) or transverse direction (TD) after being allowed to stand at 130° C. for 60 minutes may be less than or equal to 10%, specifically less than or equal to 7%, and more specifically less than or equal to 5%. A method of measuring the thermal shrinkage rate of the separator is not particularly limited and may be any generally usable method in this art of the present invention. Non-limiting examples of the method of measuring the thermal shrinkage rate of the separator are as follows: the prepared separator is cut into a size of 80 mm×80 mm in an MD direction and a TD direction to prepare samples. The samples are inserted between two sheets of paper, put into a 130° C. oven (LO-FS050, LK Lab Korea Co., Ltd.), allowed to stand for 1 hour, and cooled, and then lengths in the MD direction and the TD direction are measured to calculate a thermal shrinkage rate (%) of one sample according to Equation 2. Then, the same experiments are performed for a plurality of samples to obtain average value and calculate a thermal shrinkage rate (%).

$$\text{Thermal shrinkage rate in an } MD \text{ direction (\%)} = \{(80-\text{length in } MD \text{ direction (mm)}/80\} \times 100$$

$$\text{Thermal shrinkage rate (\%) in } TD \text{ direction} = \{(80-\text{length (mm) in } TD \text{ direction}/80\} \times 100 \quad [\text{Equation 2}]$$

According to another embodiment of the present invention, a method of manufacturing a separator including a porous substrate; and a porous adhesive layer formed on one surface or both surfaces of the porous substrate, wherein the porous adhesive layer includes polyvinylidene fluoride-based polymer microparticles having an average diameter of 200 nm to 700 nm and a nitrogen-containing binder, and the total thickness of the porous adhesive layer is 1 µm or less. The manufacturing method may include applying the porous adhesive layer composition on one surface or both surfaces of the one surface or both surfaces of the porous substrate to form a porous adhesive layer.

First, the porous adhesive layer composition may be prepared by mixing the polyvinylidene fluoride-based polymer microparticles, the nitrogen-containing binder, and the solvent and stirring the same. For example, the polyvinylidene fluoride-based polymer microparticles are stirred with water to prepare a first binder solution and the nitrogen-containing binder is stirred with water to prepare a second binder solution. Then, the first binder solution and the second binder solution are mixed and stirred to prepare a porous adhesive layer composition. The mixing may be performed by using a ball mill, a bead mill, a screw mixer, or the like. Since the polyvinylidene fluoride-based polymer and the polyethyleneimine are respectively dissolved and stirred in water to prepare a porous adhesive layer composition, a porous adhesive layer may be formed as a thin film on a porous substrate and specifically, have a thickness of less than or equal to 1 µm and more specifically, less than or equal to 0.5 µm.

Subsequently, a porous adhesive layer is formed from the porous adhesive layer composition on one surface or both surfaces of the porous substrate. Before forming the porous adhesive layer on one surface or both surfaces of the porous substrate, the porous substrate may be optionally pre-treated, for example, sulfonated, graft-treated, corona-discharged, radiated by ultraviolet rays, plasma-treated, sputter etching, or the like to improve close contacting property with the porous adhesive layer. Through the pre-treatment, the porous adhesive layer may have, for example, an island shape or a thin film shape.

A method of forming the porous adhesive layer by using the porous adhesive layer composition on the porous substrate has no particular limit but may include any method commonly used in a related art of the present invention, for example, coating, and the like. Non-limiting examples of the coating method may be a dip coating method, a die coating method, a roll coating method, a gravure coating method, or a comma coating method. These methods may be applied alone or in a combination of two or more.

Then, the porous adhesive layer may be dried optionally. Through the drying process, water used during preparation of the porous adhesive layer composition may be evaporated. In the drying process, by controlling a drying temperature and a drying time, the solvent remaining in the porous adhesive layer composition may be minimized. The drying temperature may be for example 50° C. to 100° C., and specifically 60° C. to 80° C. and the drying time may be for example 8 hours to 14 hours, and specifically 10 hours to 12 hours.

According to another embodiment of the present invention, a lithium secondary battery includes a positive electrode; a negative electrode; the separator disposed between the positive electrode and the negative electrode separator; and an electrolyte. The lithium secondary battery is not particularly limited and may be any known battery in this art of the present invention.

The lithium secondary battery may specifically be a lithium metal rechargeable battery, a lithium ion secondary battery, a lithium polymer rechargeable battery, or a lithium ion polymer rechargeable battery.

A method of manufacturing the lithium secondary battery is not particularly limited, and a general method in this art of the present invention may be used. Non-limiting examples of the method of manufacturing the lithium secondary battery are as follows: disposing a separator including the heat-resistance layer of the present invention between a positive electrode and a negative electrode, and injecting an electrolyte solution thereinto.

Figure 1:
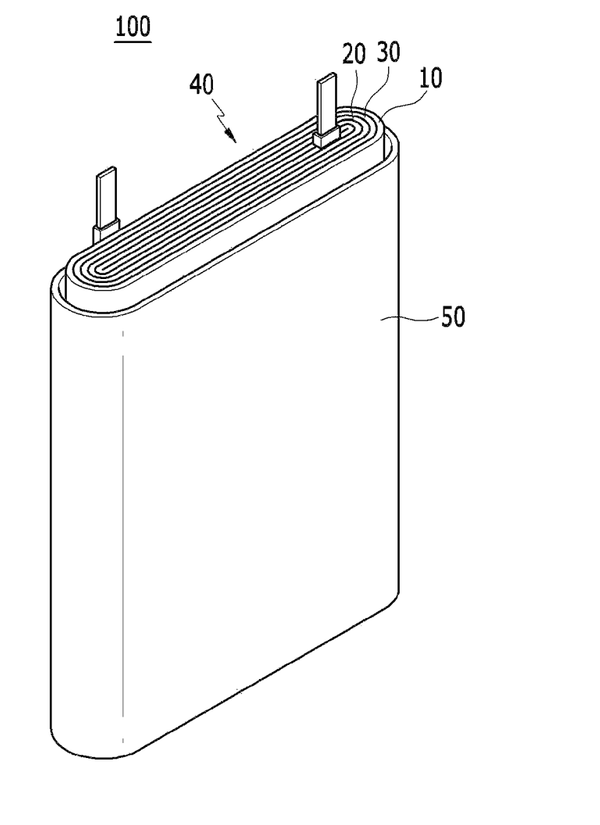
FIG. 1 is an exploded perspective view showing a lithium secondary battery according to an embodiment.

FIG. 1 is an exploded perspective view showing a lithium secondary battery. A prismatic secondary battery according to an embodiment is illustrated as an example, but the present invention is not limited thereto and may be applied to various batteries such as a lithium polymer battery and a lithium cylindrical battery.

Referring to FIG. 1, a lithium secondary battery 100 according to an embodiment includes an electrode assembly 40 manufactured by disposing a separator 30 between a positive electrode 10 and a negative electrode 20 and winding them, and a case 50 housing the electrode assembly 40. The positive electrode 10, the negative electrode 20 and the separator 30 are impregnated in an electrolyte solution (not shown).

The separator 30 is the same as described above.

The positive electrode 10 includes a positive current collector and a positive active material layer formed on the positive current collector. The positive active material layer includes a positive active material, a binder, and optionally a conductive material.

The positive current collector may use aluminum (Al), nickel (Ni), and the like, but is not limited thereto.

The positive active material may use a compound being capable of intercalating and deintercalating lithium. Specifically, at least one of a composite oxide or a composite phosphate of a metal selected from cobalt, manganese, nickel, aluminum, iron, or a combination thereof and lithium may be used. More specifically, the positive active material may use lithium cobalt oxide, lithium nickel oxide, lithium manganese oxide, lithium nickel cobalt manganese oxide, lithium nickel cobalt aluminum oxide, lithium iron phosphate, or a combination thereof.

The binder improves binding properties of positive active material particles with one another and with a current collector, and specific examples may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto. These may be used alone or in a mixture of two or more.

The conductive material improves conductivity of an electrode. Examples thereof may be natural graphite, artificial graphite, carbon black, a carbon fiber, a metal powder, a metal fiber, and the like, but are not limited thereto. These may be used alone or in a mixture of two or more. The metal powder and the metal fiber may use a metal of copper, nickel, aluminum, silver, and the like.

The negative electrode 20 includes a negative current collector and a negative active material layer formed on the negative current collector.

The negative current collector may use copper (Cu), gold (Au), nickel (Ni), a copper alloy, and the like, but is not limited thereto.

The negative active material layer may include a negative active material, a binder and optionally a conductive material.

The negative active material may be a material that reversibly intercalates/deintercalates lithium ions, a lithium metal, a lithium metal alloy, a material capable of doping and dedoping lithium, a transition metal oxide, or a combination thereof.

The material that reversibly intercalates/deintercalates lithium ions may be a carbon material which is any generally-used carbon-based negative active material, and examples thereof may be crystalline carbon, amorphous carbon, or a combination thereof. Examples of the crystalline carbon may be graphite such as amorphous, sheet-shape, flake, spherical shape or fiber-shaped natural graphite or artificial graphite. Examples of the amorphous carbon may be soft carbon or hard carbon, a mesophase pitch carbonized product, fired coke, and the like. The lithium metal alloy may be an alloy of lithium and a metal selected from Na, K, Rb, Cs, Fr, Be, Mg, Ca, Sr, Si, Sb, Pb, In, Zn, Ba, Ra, Ge, Al, and Sn. The material being capable of doping and dedoping lithium may be Si, $SiO_x$ (0<x<2), a Si—C composite, a Si—Y alloy, Sn, $SnO_2$, a Sn—C composite, Sn—Y alloy, and the like, and at least one of these may be mixed with $SiO_2$. The element Y may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof. The transition metal oxide may be vanadium oxide, lithium vanadium oxide, and the like.

The binder and the conductive material used in the negative electrode may be the same as the binder and conductive material of the positive electrode.

The positive electrode and the negative electrode may be manufactured by mixing each active material composition including each active material and a binder, and optionally a conductive material in a solvent, and coating the active material composition on each current collector. Herein, the solvent may be N-methylpyrrolidone, and the like, but is not limited thereto. The electrode manufacturing method is well known, and thus is not described in detail in the present specification.

The electrolyte solution includes an organic solvent and a lithium salt.

The organic solvent serves as a medium for transmitting ions taking part in the electrochemical reaction of a battery. Specific examples thereof may be selected from a carbonate-based solvent, an ester-based solvent, an ether-based solvent, a ketone-based solvent, an alcohol-based solvent, and an aprotic solvent.

Examples of the carbonate-based solvent may be dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC), and the like. Particularly, when the linear carbonate compounds and cyclic carbonate compounds are mixed, an organic solvent having a high dielectric constant and a low viscosity may be provided. The cyclic carbonate compound and the linear carbonate compound are mixed together in a volume ratio ranging from 1:1 to 1:9.

Examples of the ester-based solvent may be methylacetate, ethylacetate, n-propylacetate, dimethylacetate, methylpropionate, ethylpropionate, γ-butyrolactone, decanolide, valerolactone, mevalonolactone, caprolactone, and the like. Examples of the ether-based solvent may be dibutylether, tetraglyme, diglyme, dimethoxyethane, 2-methyltetrahydrofuran, tetrahydrofuran, and the like. Examples of the ketone-based solvent may be cyclohexanone, and the like, and examples of the alcohol-based solvent may be ethanol, isopropyl alcohol, and the like.

The organic solvent may be used alone or in a mixture of two or more, and when the organic solvent is used in a mixture of two or more, the mixture ratio may be controlled in accordance with a desirable cell performance.

The lithium salt is dissolved in an organic solvent, supplies lithium ions in a battery, basically operates the rechargeable battery, and improves lithium ion transportation between the positive electrode and the negative electrode therein.

Examples of the lithium salt may be $LiPF_6$, $LiBF_4$, $LiSbF_6$, $LiAsF_6$, $LiN(SO_3C_2F_5)_2$, $LiN(CF_3SO_2)_2$, $LiC_4F_9SO_3$, $LiClO_4$, $LiAlO_2$, $LiAlCl_4$, $LiN(C_xF_{2x+1}SO_2)$ $(C_yF_{2y+1}SO_2)$ (x and y are natural numbers), LiCl, LiI, $LiB(C_2O_4)_2$, or a combination thereof.

The lithium salt may be used in a concentration ranging from 0.1 M to 2.0 M. When the lithium salt is included within the above concentration range, an electrolyte may have excellent performance and lithium ion mobility due to optimal electrolyte conductivity and viscosity.

Hereinafter, Examples, Comparative Examples, and Experimental Examples are illustrated to explain the present invention in more detail. However, the following Preparation Examples, Examples, Comparative Examples, and Experimental Examples are exemplary, and the present invention is not limited thereto.

EXAMPLES AND COMPARATIVE EXAMPLES

Example 1

Preparation of First Porous Adhesive Layer Composition

A first polymer solution including polyvinylidene fluoride-based polymer microparticles having an average particle diameter of 500 nm was prepared by mixing a polyvinylidene fluoride homopolymer (a weight average molecular weight: 450000 g/mol, XPH-838, Solvey) to be 25 wt % with water and stirring the mixture with an agitator (R010, I.K Co., Ltd.) at 25° C. for 2 hours. On the other hand, a second polymer solution was prepared by mixing polyethyleneimine (a weight average molecular weight: 70000 g/mol, P-1050, Epomin) to be 7 wt % with water and then, stirring the mixture with an agitator at 25° C. for 2 hours. 25 wt % of the first polymer solution and 7 wt % of the second polymer solution were mixed to have a weight ratio of 9:1 between the polyvinylidene fluoride-based polymer microparticles and the polyethyleneimine and then, stirred with an agitator at 25° C. for 30 minutes to prepare a first porous adhesive layer composition.

Manufacture of Separator

The first porous adhesive layer composition was DM-coated to be 9 μm thick each on both surfaces of a polyethylene film and then, aged at 70° C. for 12 hours to obtain a separator having a total thickness of 10 μm according to Example 1.

Example 2

Preparation of Second Porous Adhesive Layer Composition

A second porous adhesive layer composition was prepared according to the same method as Example 1 except for mixing 25 wt % of the first polymer solution and 7 wt % of the second polymer solution to have a weight ratio of 9.6:0.4 between the polyvinylidene fluoride-based polymer microparticles and the polyethyleneimine.

Manufacture of Separator

A separator having a total thickness of 10 μm according to Example 2 was manufactured according to the same method as Example 1 except for using the second porous adhesive layer composition instead of the first porous adhesive layer composition of Example 1.

Example 3

Preparation of Third Porous Adhesive Layer Composition

A third porous adhesive layer composition was prepared according to the same method as the method of preparing the second porous adhesive layer composition according to Example 2.

Manufacture of Separator

A separator having a total thickness of 10 μm according to Example 3 was manufactured according to the same method as Example 1 except for using the third porous adhesive layer composition instead of the first porous adhesive layer composition of Example 1 and coating the third porous adhesive layer composition on one surface of a polyethylene film instead of both surfaces thereof.

Example 4

Preparation of Fourth Porous Adhesive Layer Composition

A first polymer solution including polyvinylidene fluoride-based polymer microparticles having an average particle diameter of 200 nm was prepared by mixing a polyvinylidene fluoride homopolymer (a weight average molecular weight: 450000 g/mol, XPH-838, Solvey) to be 25 wt % with water and then, stirring the mixture with an agitator (R010, I.K Co., Ltd.) at 25° C. for 2 hours. On the other hand, a second polymer solution was prepared by mixing polyethyleneimine (a weight average molecular weight: 70000 g/mol, P-1050, Epomin) to be 7 wt % with water and then, stirring the mixture at 25° C. for 2 hours. Subsequently, 25 wt % of the first polymer solution and 7 wt % of the second polymer solution were mixed in a weight ratio of 9:1 between the polyvinylidene fluoride-based polymer microparticles and the polyethyleneimine and stirred with an agitator at 25° C. for 30 minutes to prepare a mixed solution. On the other hand, alumina having an average particle diameter (D50) of 500 nm (LS235, Nippon Light Metal Company, Ltd.) was added to be 25 wt % in water and dispersed therein with a beads mill at 25° C. for 2 hours to prepare alumina dispersion. 89 wt % of the mixed solution was mixed with 11 wt % of the alumina dispersion were mixed in a weight ratio of 8:1 between a total weight of the polyvinylidene fluoride-based polymer microparticles and the polyethyleneimine and a weight of the alumina to prepare a fourth porous adhesive layer composition.

Manufacture of Separator

A separator having a total thickness of 10 μm according to Example 4 was manufactured except for using the fourth porous adhesive layer composition instead of the first porous adhesive layer composition according to Example 1.

Comparative Example 1

Preparation of Fifth Porous Adhesive Layer Composition

A first polymer solution including polyvinylidene fluoride-based polymer microparticles having an average particle diameter of 200 nm was prepared by dissolving a polyvinylidene fluoride homopolymer (a weight average molecular weight: 450000 g/mol, XPH-838, Solvey) to be 25 wt % in water and then, stirring the solution at 25° C. for 2 hours with an agitator (R010, I.K Co., Ltd.). On the other hand, polyvinyl alcohol (a weight average molecular weight: 2000 g/mol, KL-520, Kuraray Co., Ltd.) was dissolved to be 7 wt % in water, and then, the solution was stirred at 25° C. for 2 hours with an agitator to prepare a third polymer solution. 25 wt % of the first polymer solution and 7 wt % of the third polymer solution were mixed to have a weight ratio of 9.6:0.4 between the polyvinylidene fluoride-based polymer microparticles and the polyvinyl alcohol and then, stirred with an agitator at 25° C. for 30 minutes to prepare a fifth porous adhesive layer composition.

Manufacture of Separator

A separator having a total thickness of 10 μm according to Comparative Example 1 was manufactured according to the same method as Example 1 except for using the fifth porous adhesive layer composition instead of the first porous adhesive layer composition according to Example 1.

Comparative Example 2

Preparation of Sixth Porous Adhesive Layer Composition

A sixth porous composition was prepared according to the same method as Example 1 except for using polyvinylidene fluoride microparticles having an average particle diameter of 150 nm.

Manufacture of Separator

A separator having a total thickness of 10 μm according to Comparative Example 2 was manufactured according to the same method as Example 1 except for using the sixth porous adhesive layer composition instead of the first porous adhesive layer composition according to Example 1.

Comparative Example 3

Preparation of Seventh Porous Adhesive Layer Composition

A seventh porous composition was prepared according to the same method as Example 1 except for using polyvinylidene fluoride microparticles having an average particle diameter of 700 nm.

Manufacture of Separator

A separator having a total thickness of 11 μm according to Comparative Example 3 was manufactured according to the same method as Example 1 except for using the seventh porous adhesive layer composition instead of the first porous adhesive layer composition according to Example 1.

In each porous adhesive layer of the separators according to Examples 1 to 4 and Comparative Examples 1 to 3, a content (wt %) of each component relative to a total weight of the porous adhesive layer and a thickness (μm) of the porous adhesive layer are shown in Table 1.

using one laser light was appropriate for analyzing a spherical or nonspherical shape particle. Herein, the average particle diameter may be measured by fixing a solvent with water, dripping one drop of a coating liquid with a dripping pipette, and measuring a particle distribution using a sedimentation velocity method.

Air Permeability

The separators according to Examples 1 to 4 and Comparative Examples 1 to 3 were respectively cut into a size of 100 mm×100 mm in an MD direction and a TD direction, air permeability was obtained by measuring a time how long it takes for the separators to pass 100 cc of air (unit: second) by using an air permeability tester equipment (EG01-55-1MR, Asahi Seico Co., Ltd.).

Thermal Shrinkage Rate

The separators prepared in Examples 1 to 4 and Comparative Examples 1 to 3 were cut into a size of 80 mm×80 mm in an MD direction and a TD direction to prepare samples. The samples were inserted between two sheets of paper, put into a 130° C. oven (LO-FS050, LK Lab Korea Co., Ltd.), allowed to stand for 1 hour, and cooled, and then lengths in the MD direction and the TD direction were measured to calculate a thermal shrinkage rate (%) of one sample according to Equation 2. Then, the same experiments were performed for ten samples to obtain average value of ten samples and calculate thermal shrinkage rates (%) of Examples and Comparative Examples.

Thermal shrinkage rate (%) in $MD$ direction={(80 mm−length in $MD$ direction)/80}×100

Thermal shrinkage rate (%) in $TD$ direction={(80 mm−length in $TD$ direction)/80}×100     [Equation 2]

TABLE 1

|  | Ex. 1 | Ex. 2 | Ex. 3 | Ex. 4 | Comp. Ex.1 | Comp. Ex.2 | Comp. Ex.3 |
| --- | --- | --- | --- | --- | --- | --- | --- |
| Polyvinylidene fluoride-based microparticles (average particle diameter) | 90 (500 nm) | 96 (500 nm) | 96 (500 nm) | 80 (200 nm) | 96 (200 nm) | 90 (150 nm) | 90 (700 nm) |
| Polyethyleneimine | 10 | 4 | 4 | 9 | — | 10 | 10 |
| Polyvinyl alcohol | — | — | — | — | 4 | — | — |
| Alumina | — | — | — | 11 | — | — | — |
| Thickness (μm) of porous adhesive layer | 1 | 1 | 1 | 1 | 1 | 1 | 2 |

Experimental Example 1

Regarding the separators according to Examples 1 to 4 and Comparative Examples 1 to 3, average particle diameters of the polyvinylidene fluoride-based microparticles, air permeability, a thermal shrinkage rate, and a transfer rate were measured according to the following measuring methods, and the results are shown in Table 2.

Average Particle Diameter of Polyvinylidene Fluoride-based Microparticles

The surface of the polyvinylidene fluoride-based microparticles was examined by using FE-SEM S-4800 equipment made by Hitachi Ltd., and average particle diameters of the polyvinylidene fluoride-based microparticles were measured according to the following method:

A laser-diffraction size analyzer, S3500 made by Microtrac Inc. was used. S3500 made by Microtrac Inc. having a unique internal structure of using three laser light sources and two detectors unlike a conventional method of Transfer Rate Battery cells including the separators prepared in Examples 1 to 4 and Comparative Examples 1 to 3 were manufactured. Specifically, a positive active material coating composition was prepared by using LCO ($LiCoO_2$) as a positive active material, PVdF (polyvinylidene fluoride) as a binder, and carbon black as a conductive agent. The positive active material coating composition was prepared by dispersing an active material, a binder, and a conductive agent in a weight ratio of 94:3:3 in N-methyl-2-pyrrolidone with a mixer (Planetary Despa Mixer) into slurry and coating the slurry to be 94 μm thick on a 14 μm-thick aluminum foil with a doctor blade and drying it. Then, the coated foil was pressed with a roll presser and dried with a vacuum dryer to remove moisture in a coating layer, manufacturing a positive electrode. A negative active material coating composition was prepared by using graphite as a negative active material and SBR (styrene-butadiene rubber) and CMC (carboxyl methyl cellulose) as a binder. Herein, the negative active material and the binder were used in a weight ratio of 96:4, and the SBR and the CMC were used in a weight ratio of 1:1. Then, a negative electrode was manufactured according to the same method as the positive electrode except for forming a 120 μm-thick coating layer on an 8 μm-thick copper foil. The positive electrode and the negative electrode were respectively cut into a size of 100 cm×4.2 cm, separators according to Examples 1 to 4 and Comparative Examples 1 to 3 were cut into a size of 100 cm×4.4 cm and then, disposed between the positive electrode and the negative electrode and wound therewith into a size 7 cm (a length direction)×4.4 cm (a width direction), manufacturing electrode assemblies.

Each of the electrode assemblies was heated and compressed at 100° C. for 3 seconds with a pressure of 9 kgf/cm$^2$ and then inserted into an aluminum pouch, and an electrolyte solution was put thereinto and the pouch was sealed. Herein, the electrolyte solution was prepared by dissolving 1.1 M LiPF$_6$ in 2.7 g of an organic solvent of ethylene carbonate (EC)/ethylmethyl carbonate (EMC) in an EC:EMC volume ratio of 30/70. Then, the pouched electrode assembly was stored at room temperature for 12 hours, compressed at 100° C. for 30 seconds under a pressure of 9 kgf/cm$^2$, and then, stored at room temperature for 12 hours to manufacture battery cells. Then, charge, discharge, and charge were sequentially performed under the following conditions, the pouch was open to remove gas, and the area (A$_1$) of the positive active material or the negative active material transferred into the separator was measured by using a known image analyzer (ex: Easy Measure converter 1.0.0.4) after taking an image of the separator with a known image camera (ex: a high resolution camera, Lumenera Corp.).

1) charge: 4.35 V, 0.2 C, 50 mA cut-off, 5 hours
2) discharge: 0.2 C, 3 V cut-off, 5 hours
3) charge: 0.5 C, 4 V cut-off, 2 hours Then, a transfer rate of the positive active material or the negative active material into a separator after charge and discharge of Equation 1 was measured.

Transfer rate (%)=(A$_1$/A$_0$)×100    [Equation 1]

In Equation 1, A$_0$ denotes an entire area of a negative electrode or a positive electrode and A$_1$ denotes an area of a positive active material or a negative active material transferred into the separator as described above.

2 showed deteriorated air permeability. In addition, the separator having a porous adhesive layer having a thickness of 2 μm according to Comparative Example 3 also showed deteriorated air permeability and decreased electrode adherence.

The invention claimed is:

1. A separator comprising
   a porous substrate; and a porous adhesive layer formed on a first side surface of the porous substrate and/or a second side surface of the porous substrate facing away from the first side surface,
   wherein the porous adhesive layer comprises polyvinylidene fluoride-based polymer microparticles having an average diameter of 200 nm to 700 nm, a nitrogen-containing binder, and inorganic particles, and the total thickness of the porous adhesive layer is 1 μm or less,
   wherein the nitrogen-containing binder is polyethyleneimine having a weight average molecular weight of 50,000 to 100,000 g/mol, and
   wherein the inorganic particles are included in an amount of 10 to 20 wt % based on a total solid weight of the porous adhesive layer.

2. The separator of claim 1, wherein a weight ratio of the polyvinylidene fluoride-based polymer microparticles and the nitrogen-containing binder ranges from 8.5:1.5 to 9.9:0.1.

3. The separator of claim 1, wherein the polyvinylidene fluoride-based polymer microparticles comprise a polyvinylidene fluoride-based homopolymer, a polyvinylidene fluoride-based copolymer, or a mixture thereof.

4. The separator of claim 1, wherein thermal shrinkage rates in a machine direction and a transverse direction measured after being allowed to stand at 130° C. for 1 hour is less than 10%, respectively.

5. The separator of claim 1, wherein a transfer rate of a positive active material or a negative active material into the separator after charge and discharge of Equation 1 is greater than or equal to 60%:

Transfer rate (%)=(A$_1$/A$_0$)×100    [Equation 1]

wherein, in Equation 1, A$_0$ denotes an entire area of a negative electrode or a positive electrode and A$_1$ denotes an area of the positive active material or the negative active material transferred into the separator

TABLE 2

|  | Ex. 1 | Ex. 2 | Ex. 3 | Ex. 4 | Comp. Ex.1 | Comp. Ex.2 | Comp. Ex.3 |
|---|---|---|---|---|---|---|---|
| Average particle diameter (nm) of polyvinylidene fluoride microparticle | 500 | 500 | 500 | 200 | 200 | 150 | 700 |
| Air permeability (sec/100 cc) | 246 | 219 | 215 | 166 | 360 | 312 | 382 |
| Thermal shrinkage rate (%) (MD/TD) | 4.4/4.5 | 3.9/3.5 | 6.6/6.2 | 3.0/2.9 | 4.8/4.7 | 5.2/4.8 | 3.3/3.1 |
| Transfer rate (%) | 73 | 70 | 25 | 65 | 28 | 70 | 42 |

Referring to Table 2, the separators according to Examples 1 to 4 showed air permeability of less than or equal to 250 sec/100 cc, each thermal shrinkage rate of 10% in an MD direction and a TD direction, and a transfer rate of greater than or equal to 60%. On the other hand, the separator using polyvinyl alcohol instead of a nitrogen-containing binder according to Comparative Example 1 showed decreased adherence, and the separator using PVDF-based polymer microparticles having an average particle diameter of 150 nm according to Comparative Example when charge, discharge, and charge are sequentially performed after the positive electrode, the separator, and the negative electrode are sequentially stacked to form an electrode assembly, first compressing the electrode assembly at 20° C. to 110° C., for 1 to 5 seconds, and at a force of 1 to 30 kgf/cm$^2$, injecting an electrolyte solution to the compressed electrode assembly, and second compressing the same at 60° C. to 110° C., for 30 seconds to 180 seconds, at a force of 1 to 30 kgf/cm$^2$, 1) charge: 4.35 V, 0.2 C, 50 mA cut-off, 5 hours,
2) discharge: 0.2 C, 3 V cut-off, 5 hours, and
3) charge: 0.5 C, 4 V cut-off, 2 hours.

6. A lithium secondary battery, comprising a positive electrode, a negative electrode, a separator, and an electrolyte wherein the separator is the separator according to claim 1.

* * * * *